J. FENTRESS.
HOSE CONNECTOR.
APPLICATION FILED JULY 25, 1911.
1,051,396.
Patented Jan. 28, 1913.
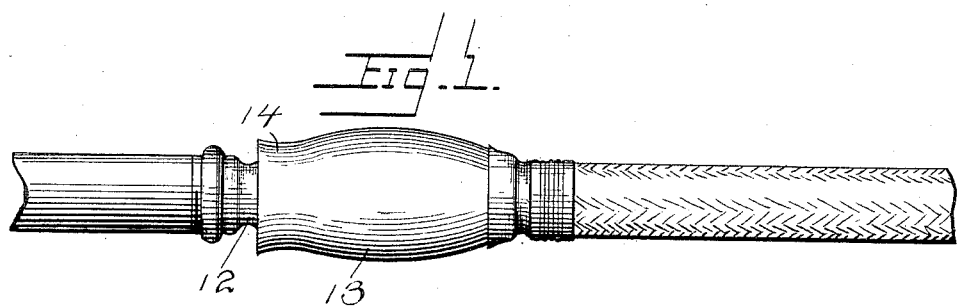
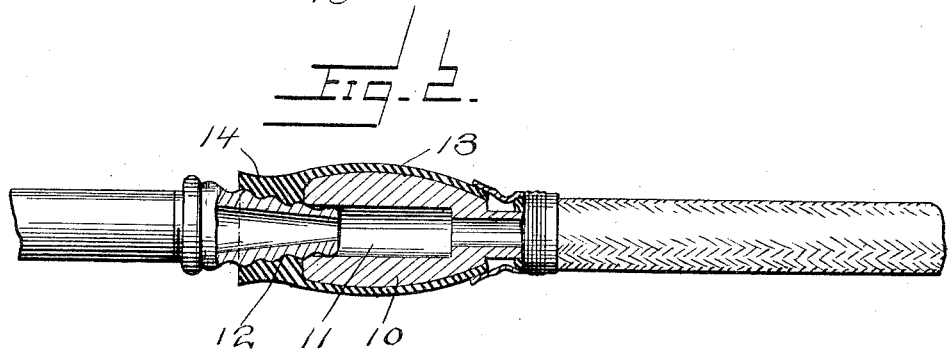
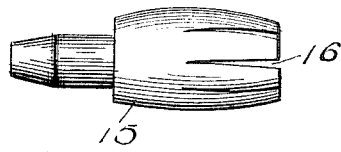
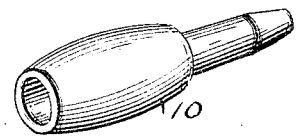
Inventor
James Fentress,
By Mason Fenwick & Lawrence,
Attorneys
Witnesses

UNITED STATES PATENT OFFICE.

JAMES FENTRESS, OF HUBBARD WOODS, ILLINOIS.

HOSE-CONNECTOR.

1,051,396.   Specification of Letters Patent.   Patented Jan. 28, 1913.

Application filed July 25, 1911. Serial No. 640,504.

*To all whom it may concern:*

Be it known that I, JAMES FENTRESS, a citizen of the United States, residing at Hubbard Woods, in the county of Cook and State of Illinois, have invented certain new and useful Improvements in Hose-Connectors; and I do hereby declare the following to be a full, clear, and exact description of the invention, such as will enable others skilled in the art to which it appertains to make and use the same.

This invention relates to hose connectors and has for an object to provide a rubber or like elastic connector connected to the end of a flexible coupling or hose, designed for connecting the hose to a nipple and embodying improved features of economy, and reliability of action.

A further object of the invention is to provide a connector eliminating a large portion of the usually expensive material from which such connectors are made, without detracting from, but rather adding to the efficiency of such connector.

A further object of the invention is to provide a rubber or other elastic outer connector member with a wooden or metallic core, such core being proportioned to receive the smaller end of the usual and ordinary connecting nipple.

With these and other objects in view the invention comprises certain novel constructions, combinations and arrangements of parts as will be hereinafter more fully described and claimed.

In the drawings:—Figure 1 is a view in side elevation of the improved connector. Fig. 2 is a longitudinal sectional view through the connector and also showing a longitudinal section of a nipple. Fig. 3 is a perspective view of the core constructed of wood or similar material. Fig. 4 is a view in side elevation of the core constructed of resilient material.

Like characters of reference indicate corresponding parts throughout the several views.

In the ordinary construction of connectors for flexible tubing such as gas tubing it is customary to employ a rubber sleeve circular in cross section and tapered at both ends, having an axial bore of substantially the same diameter throughout and with a wooden plug having a central opening inserted in one end, the other end being adapted to be forced over the reduced end of a nipple.

To construct the connector of the type just mentioned of sufficient strength to withstand ordinary use, it is necessary to employ a considerable quantity of rubber and to make the connector thick, especially at the center. As rubber is high in price connectors have not been made of material pure in quality and are therefore inefficient in operation. The present invention is designed to employ but a small amount of the expensive rubber but to construct a connector fully as efficient as one containing more rubber. To accomplish this purpose a core 10 is employed having a central bore 11 large enough to receive the end of the nipple 12. The rubber connector member is provided with a thin sheet 13 to surround and embrace the core 10 and to form an air-tight or gas-tight connection therewith, and with a thickened portion 14 into which the nipple 12 may be inserted, such thickness being required to provide sufficient elasticity to properly grip the nipple. As the nipple is inserted into the wooden core 10, any side or lateral pressure exerted upon the connector will fail to fracture the rubber material and such device will be subject only to a longitudinal pull. As such longitudinal pull will come upon all the material of the connector, only a small amount of material will withstand considerable of such strain.

Instead of constructing the core of wood as shown at 10, it is also desirable to make it of metal, as shown at 15 in Fig. 4. Such metal core is preferably provided at its larger end with V-shaped longitudinally extending slots 16 whereby the extremity of such core may be expanded and will contract as occasion may require. Like the core shown at 10 the core 15 is capable of receiving and accommodating the smaller end of the nipple 12.

I claim:—

1. In a hose connector, an elastic envelop having one end proportioned to engage a nipple and a rigid core embedded in the envelop having a bore larger than the normal diameter of the bore of the envelop said core extending at one end beyond the envelop and reduced to form a nipple.

2. In a hose connector, a rigid core having an axial bore and terminating at one end in a reduced nipple, and an elastic envelop embracing said rigid core and extending over one end of said core to produce a thickened portion having an opening to receive a nipple.

3. In a hose connector, a rigid core terminating at one end in a nipple and having an axial bore smaller in the nipple than in the remainder of said core, and an elastic envelop embracing said core, said envelop being thickened and extending over one end and presenting a hole normally smaller in diameter than the bore of the core and adapted to expand to receive a tapering nipple.

In testimony whereof I affix my signature in presence of two witnesses.

JAMES FENTRESS.

Witnesses:
GEO. E. WISSLER,
T. P. SIDDALL.

Copies of this patent may be obtained for five cents each, by addressing the "Commissioner of Patents, Washington, D. C."